(12) United States Patent
Banker et al.

(10) Patent No.: US 10,830,169 B1
(45) Date of Patent: Nov. 10, 2020

(54) METHODS AND SYSTEMS FOR ENGINE CONTROL

(71) Applicant: Ford Global Technologies, LLC, Dearborn, MI (US)

(72) Inventors: Adam Banker, Canton, MI (US); Amey Karnik, Canton, MI (US); Michael Howard Shelby, Plymouth, MI (US); Russell Senior, Linden, MI (US); Adam Krach, Canton, MI (US)

(73) Assignee: Ford Global Technologies, LLC, Dearborn, MI (US)

( * ) Notice: Subject to any disclaimer, the term of this patent is extended or adjusted under 35 U.S.C. 154(b) by 0 days.

(21) Appl. No.: 16/417,527

(22) Filed: May 20, 2019

(51) Int. Cl.
| | |
|---|---|
| *F02D 41/00* | (2006.01) |
| *F02D 17/02* | (2006.01) |
| *F02D 41/14* | (2006.01) |
| *F02D 9/02* | (2006.01) |

(52) U.S. Cl.
CPC ....... *F02D 41/1454* (2013.01); *F02D 17/023* (2013.01); *F02D 41/0087* (2013.01); *F02D 2009/0228* (2013.01)

(58) Field of Classification Search
CPC .. F02D 41/123; F02D 41/126; F02D 41/0087; F02D 17/02; F02D 41/0005; F02D 13/06; F02D 2041/0012
See application file for complete search history.

(56) References Cited

U.S. PATENT DOCUMENTS

| | | | | |
|---|---|---|---|---|
| 2012/0285161 | A1* | 11/2012 | Kerns | F02D 41/0087 60/598 |
| 2014/0032083 | A1* | 1/2014 | Kerns | F02D 41/0002 701/105 |
| 2014/0352659 | A1* | 12/2014 | Glugla | F02D 41/2406 123/350 |
| 2016/0258376 | A1* | 9/2016 | Jammoussi | F02D 41/123 |
| 2017/0234253 | A1* | 8/2017 | Serrano | F02D 17/02 123/436 |
| 2018/0170353 | A1* | 6/2018 | Ulrey | F02M 35/10209 |

* cited by examiner

*Primary Examiner* — Sizo B Vilakazi
(74) *Attorney, Agent, or Firm* — Geoffrey Brumbaugh; McCoy Russell LLP (57) ABSTRACT

Methods and systems are provided for improving fuel efficiency and tailpipe emissions of a variable displacement engine. Fueling is initially disabled in cylinders selected to be deactivated while pumping air through the cylinders to an exhaust after-treatment catalyst, and then valve operation is disabled. On reactivation, if manifold vacuum is dissipated, one bank of cylinders are reactivated while the other bank is operated in DFSO with valves pumping air until manifold vacuum is reestablished.

20 Claims, 5 Drawing Sheets

METHODS AND SYSTEMS FOR ENGINE CONTROL

FIELD

The present description relates generally to methods and systems for controlling a vehicle engine having variable displacement capabilities to provide additional fuel economy benefits.

BACKGROUND/SUMMARY

Some engines, known as variable displacement engines (VDE), may be configured to operate with a variable number of active and deactivated cylinders to increase fuel economy. Therein, a portion of the engine's cylinders may be disabled during selected conditions defined by parameters such as a speed/load window, as well as various other operating conditions including engine temperature. An engine control system may disable a selected group of cylinders, such as a bank of cylinders, through the control of a plurality of selectively deactivatable fuel injectors that affect cylinder fueling (also referred to as a deceleration fuel shut-off event, or DFSO), and/or through the control of the ignition system to selectively control (e.g., withhold) spark to deactivatable cylinders. In some examples, an engine controller may continuously rotate the identity of cylinders that receive air and fuel, and those that are skipped, as well as vary a number of cylinder events over which a specific deactivation pattern is applied. By skipping air and fuel delivery to selected cylinders, the active cylinders can be operated near their optimum efficiency, increasing the overall operating efficiency of the engine. By varying the identity and number of cylinders skipped, a large range of engine displacement options may be possible.

Still further improvements in fuel economy can be achieved by selectively enabling a plurality of cylinder valve deactivators (or deactivation mechanisms) that affect the operation of the cylinder's intake and/or exhaust valves. By disabling the valves, the engine enters a deceleration cylinder cut-off operation (DCCO) mode wherein engine displacement is reduced, resulting in a further drop in pumping losses. However, while in the DCCO configuration, the intake manifold fills with air, and equalizes with barometric pressure. That is, the manifold vacuum is dissipated. Consequently, when cylinders are re-enabled, the manifold pressure may be higher than desired, causing an initial number of firing cylinders to produce a larger than desired amount of torque. These undesired torque transients can affect vehicle drivability.

One example approach for addressing the manifold filling during a DCCO is shown by Serrano et al. in U.S. Patent Application Publication No. 2017/0234253. Therein, during a transition out of DCCO, the engine is operated in an air pumping skip fire mode that reduces manifold pressure. At this time, the valves are active but fuel is not injected. This has the effect of pumping down the manifold pressure while not producing torque. After the manifold pressure has been reduced to a target value, the engine can be transitioned to either a cylinder deactivation skip fire operational mode or other appropriate operational mode.

However, the inventors herein have recognized potential issues with such systems. As one example, during the pumping down of manifold pressure, air is passed through the engine to the exhaust catalysts. When the cylinders are active, the engine first needs to enter a catalyst regeneration mode which involves running the cylinders richer than intended to reduce the excess oxygen loaded on the catalysts. This can result in a fuel penalty that can undo the fuel economy of the preceding DCCO and/or DFSO operation. In addition, the very first cylinder event without air pumping in the skip fire mode, regardless of the induction ratio, may have a very large torque pulse, generating more torque than was desired.

In one example, the issues described above may be addressed by a method for operating an engine with selectively deactivatable cylinders, comprising: operating an engine with cylinder valves and fuel injectors of a first and second group of cylinders deactivated; and responsive to cylinder reactivation conditions being met, operating the first group of cylinders with cylinder valves reactivated and fuel injectors disabled while operating the second group of cylinders fueled and with all engine cylinder valves reactivated until manifold pressure is lower than a threshold. In this way, manifold pressure can be reduced following a DCCO event in a more fuel-efficient manner.

As one example, responsive to cylinder deactivation conditions being met, one or more engine cylinders may be selectively deactivated by disabling fuel (that is, DFSO) and spark delivery while continuing to pump air through cylinder intake and exhaust valves. The deactivated cylinders may include cylinders on one or both banks of the engine. Then, if DCCO entry conditions are met, selected cylinder valves may also be deactivated to enter a DCCO mode. When DCCO exit conditions are met, an engine controller may operate cylinders on a first engine bank with valves reactivated and fuel disabled to bleed down manifold pressure while concurrently operating cylinders of a second bank with valves and fuel reactivated. Further, the second bank may be operated at stoichiometry. This may be continued until the manifold pressure drops below a threshold where the torque output of the engine (determined as a function of the real-time manifold pressure value) matches the operator torque demand. Then fueling may be resumed in the reactivated cylinders of the first bank. Further, the first bank may be fueled richer than stoichiometry for a duration to regenerate the exhaust catalysts coupled downstream of the first bank.

In this way, reactivation of cylinder fueling and cylinder valve operation can be better coordinated to reduce manifold pressure on exit out of DCCO. The technical effect of transitioning from DCCO to DFSO on only one engine bank, while reactivating fuel and valve operation on the other bank, is that manifold pressure can be reduced without oxygen loading the exhaust catalyst of both banks. As a result, a fuel penalty associated with regenerating the exhaust catalyst upon exit from DCCO can be limited to only the one bank. Overall, engine fuel economy and exhaust emissions are improved.

It should be understood that the summary above is provided to introduce in simplified form a selection of concepts that are further described in the detailed description. It is not meant to identify key or essential features of the claimed subject matter, the scope of which is defined uniquely by the claims that follow the detailed description. Furthermore, the claimed subject matter is not limited to implementations that solve any disadvantages noted above or in any part of this disclosure.

DETAILED DESCRIPTION

Figure 1:
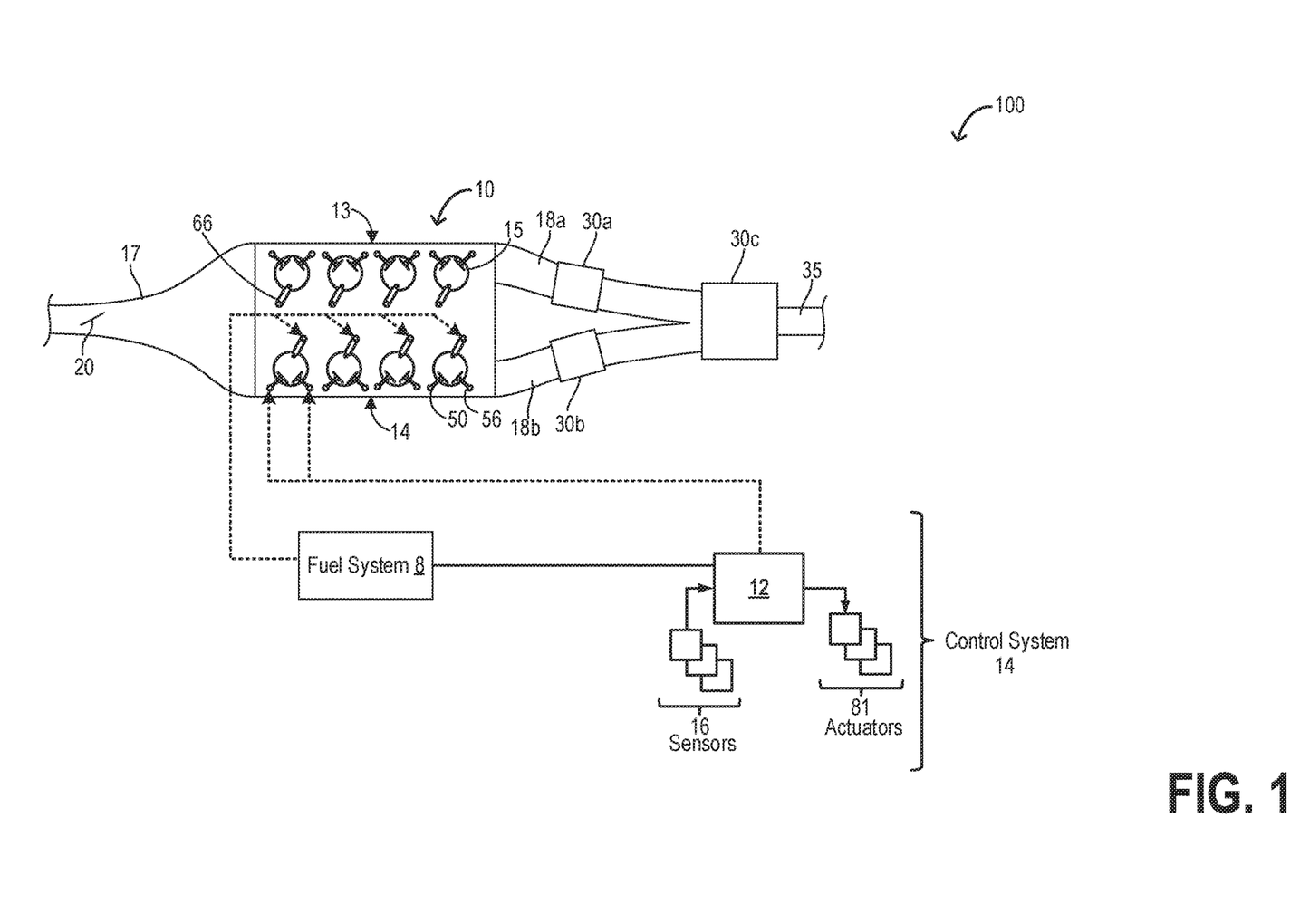
FIG. 1 shows a schematic depiction of an example engine system that is selectively deactivatable.
Figure 2:
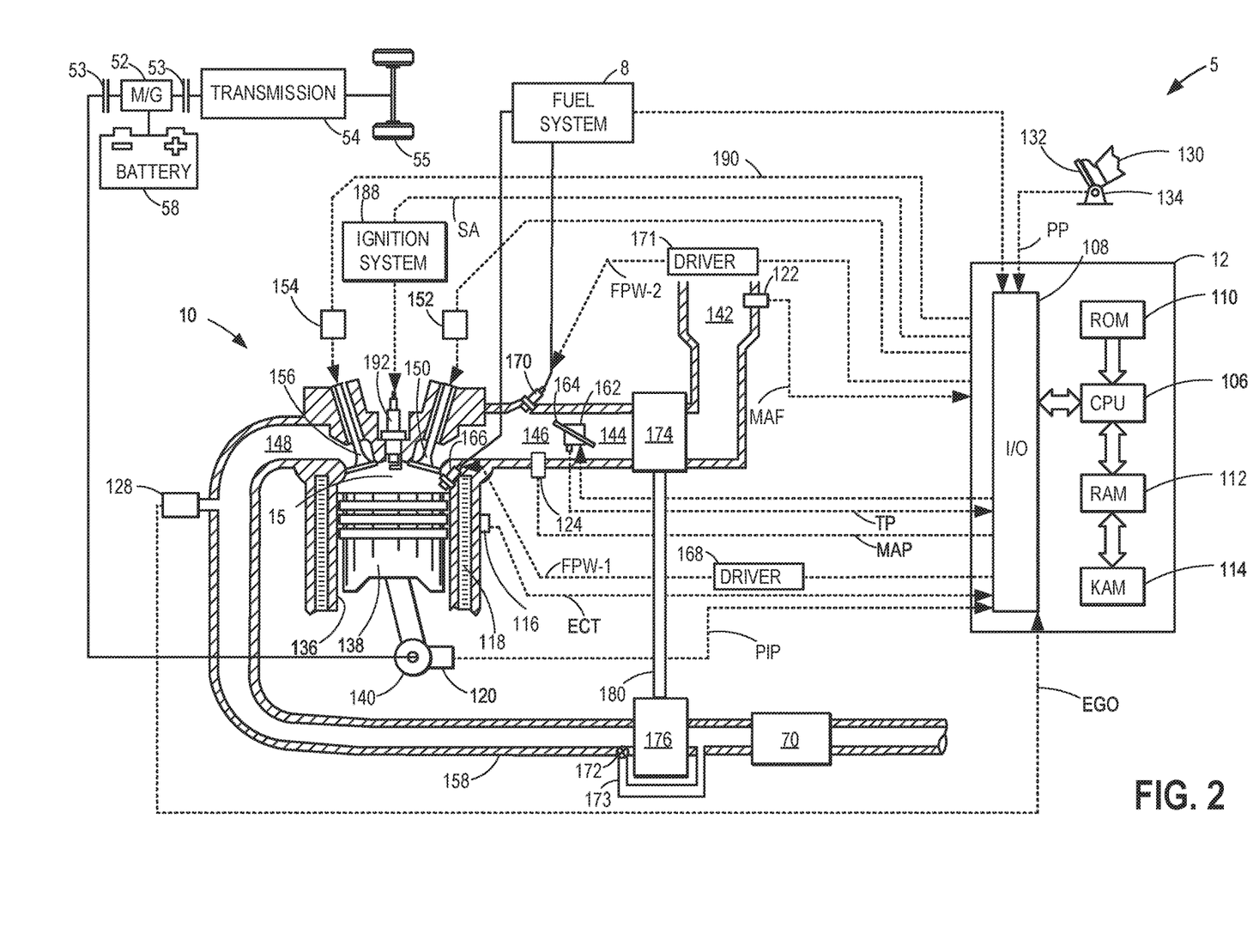
FIG. 2 shows a schematic diagram of a vehicle system with an emission control device that includes the engine system of FIG. 1.

The following description relates to systems and methods for improving balance between emissions compliance and fuel economy in an engine configured with selectively deactivatable cylinders, such as the engine system of FIG. 1 coupled in the vehicle system of FIG. 2. An engine controller may be configured to perform a control routine, such as the example routine of FIGS. 3 and 4, responsive to DCCO exit conditions being met. Therein, the controller may transition one bank of engine cylinders from a DCCO mode to a DFSO mode while reactivating the engine cylinders of the other bank. The engine cylinders of the first bank may be transitioned out of the DFSO mode once the manifold pressure has been sufficiently reduced. An example cylinder deactivation and reactivation event is shown at FIG. 5. In this way, fuel economy and emissions compliance are both achieved.

Turning now to FIG. 1, an example engine system 100 is shown. Engine system 100 includes an engine 10 having a first cylinder bank 13 and a second cylinder bank 14. In the depicted example, engine 10 is a V-8 engine with two cylinder banks, each having four cylinders 15. However in alternate examples, the engine may have an alternate configuration, such as an alternate number of cylinders (e.g., V-4, V-6, etc.), or an in-line arrangement of cylinders (e.g., I-3, I-4, etc.). Engine 10 has an intake manifold 17, with intake throttle 20. Engine 10 may operate on a plurality of substances, which may be delivered via fuel system 8. As one non-limiting example, engine 10 can be included as part of a propulsion system for a passenger vehicle, such as the vehicle system of FIG. 2.

Engine 10 is depicted having a split exhaust manifold with a first exhaust manifold branch 18a configured to receive exhaust from cylinders of first cylinder bank 13, and a second exhaust manifold branch 18b configured to receive exhaust from cylinders of second cylinder bank 14. A first emission control device 30a is coupled to the first exhaust manifold branch 18a while a second emission control device 30b is coupled to the second exhaust manifold branch 18b. Further, the first and second exhaust manifold branches may merge upstream of a common emission control device 30c. Emission control devices 30a-c include one or more catalysts, such as described with regard to FIG. 2. For example, each of devices 30a-b may be three-way catalysts while device 30c may be a muffler or particulate matter filter. Exhaust from each exhaust manifold branch may be treated at the corresponding exhaust catalyst before being treated together at the common exhaust catalyst and being released to the atmosphere via tailpipe 35. One or more air-fuel ratio sensors may be coupled to the exhaust manifold and tailpipe, such as described with regard to FIG. 2.

Engine 10 may be a variable displacement engine (VDE), having one or more cylinders 14 with selectively deactivatable (direct) fuel injectors 66. Therein, selected cylinders may be deactivated by shutting off the respective fuel injectors and disabling spark delivery. Fueling may be deactivated while maintaining operation of cylinder intake and exhaust valves such that air may continue to be pumped through the cylinders. This process may be referred to herein as a deceleration fuel shut-off (or cut-off) event, or simply DFSO.

In some examples, one or more of the cylinders 15 may also be configured with selectively deactivatable intake valves 50 and selectively deactivatable exhaust valves 56. Therein, selected cylinders may be deactivated by shutting off the respective cylinder valves, by a process referred to herein as a deceleration cylinder cut-off event, or simply DCCO. In one example, intake valves 50 and exhaust valves 56 are configured for electric valve actuation (EVA) via electric individual cylinder valve actuators. In other examples, the intake and exhaust valves may be cam-actuated. While the depicted example shows each cylinder having a single intake valve and a single exhaust valve, in alternate examples, as elaborated at FIG. 2, each cylinder may have a plurality of selectively deactivatable intake valves and/or a plurality of selectively deactivatable exhaust valves.

During selected conditions, such as when the full torque capability of the engine is not needed, one or more cylinders of engine 10 may be selected for selective deactivation (herein also referred to as individual cylinder deactivation). This may include selectively deactivating one or more cylinders on the first cylinder bank 13, and/or selectively deactivating one or more cylinders on the second cylinder bank 14. The number and identity of cylinders deactivated on the cylinder bank may be symmetrical or asymmetrical. An engine controller 12 may continually analyze individual cylinders, determining whether to activate or deactivate each cylinder based on a driver's pedal position input and torque demands, providing what is known as a skip-fire or rolling VDE (rVDE) mode of operation. In still other examples, entire banks or subsets of cylinders may be deactivated.

During the deactivation, selected cylinders may be deactivated by first disabling cylinder fueling (that is, DFSO) while allowing air to continue to be pumped through the deactivated cylinders. In addition to stopping fuel flow to the deactivated cylinders, spark to the deactivated cylinders may also be stopped, such as by selectively controlling the vehicle ignition system to only deliver spark to active cylinders. While the selected cylinders are disabled, the remaining enabled or active cylinders continue to carry out combustion with fuel injectors 66 and cylinder valve mechanisms active and operating. To meet the torque requirements, the engine produces the same amount of torque on the active cylinders. This requires higher manifold pressures, resulting in lowered pumping losses and increased engine efficiency. Also, the lower effective surface area (from only the enabled cylinders) exposed to combustion reduces engine heat losses, improving the thermal efficiency of the engine.

Oxygen in the air pumped through the deactivated cylinders, however, can cause oxygen saturation and consequent deactivation of an after-treatment exhaust catalyst of emission control device 30 due to prolonged exposure to a leaner than stoichiometric air-fuel ratio. Following the deactivation, the regeneration of the exhaust catalyst requires the air-fuel ratio to run richer than stoichiometry for a duration. This can reduce the fuel economy impact of the VDE operation. However, the change in air-fuel ratio (specifically, the transition to a leaner air-fuel ratio upon disabling cylinder fueling) can be advantageously leveraged to diagnose the after-treatment catalyst, and any associated oxygen sensors, particularly when conducting an on-board diagnostic routine.

Further improvements in fuel economy are achieved by also deactivating individual cylinder valve mechanisms. Therein, cylinder valves may be selectively deactivated via hydraulically actuated lifters (e.g., lifters coupled to valve pushrods), via a cam profile switching mechanism in which a cam lobe with no lift is used for deactivated valves, or via the electrically actuated cylinder valve mechanisms coupled to each cylinder.

Closing individual cylinder valve mechanisms (e.g., VDE mechanisms), such as intake valve mechanisms, exhaust valve mechanisms, or a combination of both, reduces the oxygen saturation of the after-treatment catalyst in addition to reducing cylinder pumping losses. However, during the DCCO, the manifold pressure starts to equilibrate with barometric pressure. In other words, manifold vacuum generated during engine operation may be dissipated over the duration of the DCCO such that by the time cylinders are to be reactivated, the manifold pressure may be higher than desired. As elaborated herein with reference to FIGS. 3 and 4, responsive to cylinder reactivation conditions, an engine controller may initiate a transition from DCCO to DFSO on only one engine bank (e.g., a first bank) while reactivating fuel and valve operation on all cylinders of the other engine bank. As a result, manifold pressure may be reduced via pumping of air through the reactivated valves and only the exhaust catalyst coupled downstream of the first bank may need to regenerated. Concurrently, the other engine bank may be operated at stoichiometry. Once the manifold pressure has been sufficiently reduced, fueling of the first bank may be resumed and the cylinders may be operated richer than stoichiometry for a duration to regenerate the downstream exhaust catalyst. In this way, the overall fuel penalty associated with the reactivation is reduced.

Cylinders 15 may be deactivated to provide a specific firing (e.g., skip-firing or rolling VDE) pattern based on a designated control algorithm. More specifically, selected "skipped" cylinders are not fired while other "active" cylinders are fired. Optionally, a spark timing associated with a selected firing of a selected working chamber may also be adjusted based on a firing order or firing history of the selected working chamber. As used herein, the firing pattern or deactivation pattern may include a total number of deactivated cylinders relative to remaining active cylinders, as well as an identity of the deactivated and active cylinders. The firing pattern may further specify a total number of combustion events for which each deactivated cylinder is held deactivated, and/or a number of engine cycles over which the pattern is operated. The engine controller 12 may be configured with suitable logic, as described below, for determining a cylinder deactivation (or skip-firing) pattern based on engine operating conditions. For example, the controller may select a desired induction ratio to apply based on engine operating parameters, including operator torque demand, and then select a cylinder deactivation pattern that enables the desired induction ratio to be provided. As used herein, the induction ratio is defined as the number of actual cylinder induction events (e.g., cylinders firing) that occur divided by the number of cylinder induction event opportunities (e.g., total engine cylinders).

Engine controller 12 may include a drive pulse generator and a sequencer for determining a cylinder pattern that provides the desired induction ratio based on the desired engine output at the current engine operating conditions. For example, the drive pulse generator may use adaptive predictive control to dynamically calculate a drive pulse signal that indicates which cylinders are to be fired and at what intervals to obtain the desired output (that is, the cylinder firing/skip-firing pattern). The cylinder firing pattern may be adjusted to provide the desired output without generating excessive or inappropriate vibration within the engine. As such, the cylinder pattern may be selected based on the configuration of the engine, such as based on whether the engine is a V-engine, an in-line engine, the number of engine cylinders present in the engine, etc. Based on the selected cylinder pattern, the individual cylinder valve mechanisms of the selected cylinders may be closed while fuel flow and spark to the cylinders are stopped, thereby enabling the desired induction ratio to be provided.

Since optimal efficiency for a given cylinder is near full output, a lower frequency of firing events may be chosen to reduce output. For example, skipping every other cylinder would produce half of the power, on average. In addition, a spacing between the firing events may be adjusted to minimize NVH. Whether all of the cylinders are included in the skip-firing pattern may depend on the fraction of the full engine output desired, the full engine torque output itself depending upon various conditions, such as cam timing, cylinder temperature, etc.

In this way, by adjusting the cylinder pattern of individual cylinder valve mechanisms and individual cylinder fuel injectors, a desired engine output can be provided by operating fewer cylinders more efficiently, thereby improving fuel economy.

Engine 10 may be controlled at least partially by a control system 14 including controller 12. Controller 12 may receive various signals from sensors 16 coupled to engine 10 (and described with reference to FIG. 2), and send control signals to various actuators 81 coupled to the engine and/or vehicle (as described with reference to FIG. 2). The various sensors may include, for example, various temperature, pressure, and air-fuel ratio sensors. In addition, controller 12 may receive an indication of throttle position from a throttle position sensor.

Turning now to FIG. 2, it schematically illustrates one cylinder of a multi-cylinder engine 10, which may be included in a propulsion system of a vehicle system 5. In one example, engine 10 is the variable displacement engine 10 of FIG. 1. Components previously introduced may be similarly numbered.

In some examples, vehicle system 5 may be a hybrid vehicle with multiple sources of torque available to one or more vehicle wheels 55. In other examples, vehicle system 5 is a conventional vehicle with only an engine, or an electric vehicle with only electric machine(s). In the example shown, vehicle system 5 includes engine 10 and an electric machine 52. Electric machine 52 may be a motor or a motor/generator. Crankshaft 140 of engine 10 and electric machine 52 are connected via a transmission 54 to vehicle wheels 55 when one or more clutches 53 are engaged. In the depicted example, a first clutch 53 is provided between crankshaft 140 and electric machine 52, and a second clutch 53 is provided between electric machine 52 and transmission 54. Controller 12 may send a signal to an actuator of each clutch 53 to engage or disengage the clutch, so as to connect or disconnect crankshaft 140 from electric machine 52 and the components connected thereto, and/or connect or disconnect electric machine 52 from transmission 54 and the components connected thereto. Transmission 54 may be a gearbox, a planetary gear system, or another type of transmission. The powertrain may be configured in various manners including as a parallel, a series, or a series-parallel hybrid vehicle.

Electric machine 52 receives electrical power from a traction battery 58 to provide torque to vehicle wheels 55.

Electric machine 52 may also be operated as a generator to provide electrical power to charge battery 58, for example during a braking operation.

Engine 10 may be controlled at least partially by a control system including controller 12 and by input from a vehicle operator 130 via an input device 132. In this example, input device 132 includes an accelerator pedal and a pedal position sensor 134 for generating a proportional pedal position signal PP. Combustion chamber (e.g., cylinder) 15 of engine 10 may include combustion chamber walls 136 with piston 138 positioned therein. In some embodiments, the face of piston 138 inside cylinder 15 may have a bowl. Piston 138 may be coupled to crankshaft 140 so that reciprocating motion of the piston is translated into rotational motion of the crankshaft. Crankshaft 140 may be coupled to at least one drive wheel of a vehicle via an intermediate transmission system. Further, a starter motor (not shown) may be coupled to crankshaft 140 via a flywheel to enable a starting operation of engine 10.

Combustion chamber 15 may receive intake air from intake manifold 146 via intake passages 142 and 144, and may exhaust combustion gases via exhaust manifold 148. In this way, intake passages 142 and 144 are fluidically coupled to intake manifold 146. Intake manifold 146 and exhaust manifold 148 can selectively communicate with combustion chamber 14 via a respective intake valve 150 and exhaust valve 156. In some embodiments, combustion chamber 15 may include two or more intake valves and/or two or more exhaust valves.

Intake valve 150 and exhaust valve 156 may be controlled by controller 12 via respective electric variable valve actuators 152 and 154. Alternatively, the variable valve actuators 152 and 154 may be electro-hydraulic, cam actuated, or any other conceivable mechanism to enable valve actuation. During some conditions, controller 12 may vary the signals provided to the variable valve actuators to control the opening and closing of the respective intake and exhaust valves. The position of intake valve 150 and exhaust valve 156 may be determined by respective valve position sensors (not shown). In alternative embodiments, one or more of the intake and exhaust valves may be actuated by one or more cams, and may utilize one or more of cam profile switching (CPS), variable cam timing (VCT), variable valve timing (VVT) and/or variable valve lift (VVL) systems to vary valve operation. For example, cylinder 15 may alternatively include an intake valve controlled via electric valve actuation and an exhaust valve controlled via cam actuation including CPS and/or VCT.

Fuel injector 166 is shown coupled directly to combustion chamber 14 for injecting fuel directly therein in proportion to the pulse width of signal FPW-1 received from controller 12 via electronic driver 168. In this manner, fuel injector 166 provides what is known as direct injection of fuel into combustion chamber 14. It will be appreciated that the fuel injector may be mounted in the side of the combustion chamber or in the top of the combustion chamber, for example.

Fuel injector 170 is shown coupled directly to intake manifold 146 for injecting fuel directly therein in proportion to the pulse width of signal FPW-2 received from controller 12 via electronic driver 171. In this manner, fuel injector 170 provides what is known as port injection of fuel into intake manifold 146. Fuel may be delivered to fuel injector 166 and 170 by a fuel system 8 that may include a fuel tank, a fuel pump, and a fuel rail. It will be appreciated that engine 10 may include one or more of port fuel injection and direct injection.

As previously mentioned, some engine embodiments may include operating one or more cylinders of the engine in a deceleration fuel shut-off (DFSO) mode to increase fuel economy. When the engine is operated in DFSO mode, the engine is operated without fuel injection while the engine continues to rotate and pump air through the cylinders. Specifically, fuel injection via fuel injector 166 and/or fuel injector 170 to one or more cylinders 15 is disabled while intake air may continue to be pumped through the cylinders from the intake manifold to the exhaust manifold through the cylinders, via the operating intake and exhaust valves. DFSO entry conditions may be based on a plurality of vehicle and engine operating conditions. In particular, a combination of one or more of vehicle speed, vehicle acceleration, engine speed, engine load, throttle position, pedal position, transmission gear position, and various other parameters may be used to determine whether the engine will be entering DFSO. In one example, DFSO entry conditions may be met when engine cylinders can be deactivated, such as when the vehicle is decelerating (e.g., vehicle speed is decreasing). In another example, the DFSO entry conditions (and cylinder deactivation conditions) may be based on an engine speed below a threshold. In yet another example, the DFSO entry conditions may be based on an engine load below a threshold and/or decreasing engine load. In still another example, the DFSO condition may be based on an accelerator pedal position that indicates no torque is being requested. For example, during a tip-out where an operator releases the accelerator pedal (e.g., input device 132), cylinder deactivation and DFSO entry conditions may be met.

One or more cylinders of the engine may additionally be operated in a deceleration cylinder cut-off (DCCO) mode to further increase fuel economy over and above the fuel economy achieved in the DFSO mode. When the engine is operated in DCCO mode, the engine is operated without fuel injection and additionally the cylinder valves are deactivated to prevent air from being pumped through the cylinders. Closing of the valves disables flow of air to the exhaust components, and does not allow any oxygen from the air to saturate the after-treatment catalyst. Instead, the cylinders act as an air spring where most of the energy put into the compression stroke is returned in the following blowdown stroke. In the DCCO mode, fuel injection via fuel injector 166 and/or fuel injector 170 to one or more cylinders 15 is disabled and intake air may not be allowed to be pumped through the cylinders from the intake manifold to the exhaust manifold through the cylinders, via the operating intake and exhaust valves. DCCO entry conditions may be the same as those discussed earlier with reference to DFSO entry conditions. In addition, as elaborated at FIGS. 3 and 4, a transition from the DCCO mode to the DFSO mode may be enabled on a single engine bank after cylinder reactivation conditions are met to allow a manifold pressure to be reduced and to limit catalyst oxygen saturation (and the associated rich regeneration) to only one bank.

Ignition system 188 can provide an ignition spark to combustion chamber 15 via spark plug 192 in response to spark advance signal SA from controller 12, under select operating modes. Though spark ignition components are shown, in some embodiments, combustion chamber 15 or one or more other combustion chambers of engine 10 may be operated in a compression ignition mode, with or without an ignition spark.

Intake passage 144 or intake manifold 146 may include a throttle 162 (which may be throttle 20 of FIG. 1, in one example) having a throttle plate 164. In this particular example, the position of throttle plate 164, or a throttle opening, may be varied by controller 12 via a signal provided to an electric motor or actuator included with throttle 162, a configuration that is commonly referred to as electronic throttle control (ETC). In this manner, throttle 162 may be operated to vary the intake air provided to combustion chamber 15 among other engine cylinders. The position of throttle plate 164 may be provided to controller 12 by throttle position signal TP. Intake passage 142 may include a mass airflow sensor 122 for providing a MAF signal to controller 12, and intake manifold 146 may include a manifold absolute pressure sensor 124 for providing a MAP signal to controller 12.

Engine 10 may further include a compression device such as a turbocharger or supercharger including at least a compressor 174 arranged along intake passage 144. For a turbocharger, compressor 174 may be at least partially driven by a turbine 176 (e.g., via a shaft 180) arranged along an exhaust passage 158. If the engine includes a supercharger, compressor 174 may be at least partially driven by the engine 10 and/or an electric machine, and may not include a turbine. The compression device (e.g., turbocharger or supercharger) allows the amount of compression provided to one or more cylinders of the engine to be varied by controller 12.

In some embodiments, engine 10 may include an exhaust gas recirculation (EGR) system that includes a low pressure (LP) EGR and/or high pressure (HP) EGR passage for recirculating exhaust gas (not shown). One example of an EGR system includes a low pressure (LP) EGR system, where EGR may be routed from downstream of turbine 176 of a turbocharger to upstream of a compressor 174 of the turbocharger. In a high pressure (HP) EGR system, EGR may be routed from upstream of the turbine 176 of the turbocharger to downstream of the compressor 174 passage of the turbocharger. In both the LP and HP EGR systems, the amount of EGR provided to intake manifold 146 may be varied by controller 12 via a respective LP EGR valve and HP EGR valve (not shown). Further, an EGR sensor (not shown) may be arranged within the respective LP EGR passage and/or HP EGR passage, and may provide an indication of one or more of pressure, temperature, and concentration of the exhaust gas. Alternatively, the EGR flow may be controlled through a calculated value based on signals from the MAF sensor (upstream), MAP (intake manifold), MAT (manifold gas temperature) and the crank speed sensor. Further, the EGR flow may be controlled based on an exhaust oxygen sensor 128 and/or an intake oxygen sensor (not shown). Under some conditions, the EGR system may be used to regulate the temperature of the air and fuel mixture within the combustion chamber and/or the temperature proximate to a particulate filter 72.

It will be appreciated that in several embodiments, exhaust passage 158 may include a bypass passage 173 with an inlet positioned upstream of the turbine 176. A flow control valve, known as a wastegate valve 172, may be disposed in the bypass passage. By adjustment of the position (e.g., degree of opening) of the wastegate valve 172, the amount of exhaust gas bypassing turbine 176 may be controlled. Position of the wastegate valve may be controlled via a wastegate actuator (not shown, and which may be hydraulic, pneumatic, electric, or mechanical in nature) responding to a signal from controller 12. For example, the controller 12 may receive an operator request to increase engine torque, and may increase boost pressure in order to meet the torque request.

Similarly, it will be appreciated that compressor 174 may include a recirculation passage (not shown) across the compressor. The recirculation passage may be used for recirculating (warm) compressed air from the compressor outlet back to the compressor inlet. In some embodiments, the compressor recirculation system may alternatively, or additionally, include a recirculation passage for recirculating (cooled) compressed air from the compressor outlet, downstream of a charge air cooler (not shown) to the compressor inlet or compressor bypass for dissipating compressed air to atmosphere. A flow control valve, known as a compression recirculation valve (not shown), may be included between the intake passage 142 and the recirculation passage. Depending on position of the wastegate valve, the amount of recirculating intake air may be controlled.

Emission control device (ECD) 70 is shown arranged along exhaust passage 158 downstream of exhaust manifold 148 and downstream of exhaust gas sensor 128. Exhaust gas sensor 128 is shown coupled to exhaust passage 158 upstream of emission control device (ECD) 70. Exhaust gas sensor 128 may be any suitable sensor for providing an indication of exhaust gas air/fuel ratio such as a linear oxygen sensor or UEGO (universal or wide-range exhaust gas oxygen), a two-state oxygen sensor or EGO, a HEGO (heated EGO), a NOx, HC, or CO sensor. In the depicted example, exhaust gas sensor 128 is configured as a UEGO.

In this example, ECD 70 (herein also referred to as the exhaust after-treatment system) includes a first upstream catalyst 71 and a second downstream catalyst 72. In one example, the first, upstream catalyst is a three way catalytic converter (TWC), but it will be appreciated that any type of catalyst or catalytic converter may be used without departing from the scope of this disclosure, such as a diesel oxidation catalyst (DOC), a selective catalytic reduction catalyst (SCR), lean NOx trap (LNT), etc. The second downstream catalyst 72 may be a particulate filter (PF), but it will be appreciated that the filter may be any type of particulate filter, including but not limited to a diesel particulate filter (DPF) or a gasoline particulate filter (GPF). In alternate examples, the second catalyst may be a secondary TWC, or a coated PF (such as a combination of PF and TWC). Further still, in some examples, the first catalyst may be a full-volume system occupying all the volume of the ECD, in which case there may be no separate second catalyst.

ECD 70 further includes a downstream exhaust gas oxygen sensor, also referred to herein as a catalyst monitor sensor (CMS) 228, which may be any type of exhaust gas sensor, including an oxygen sensor or HEGO sensor. In the depicted example, CMS 228 is configured as a HEGO sensor. CMS 228 is coupled downstream of upstream catalyst 71 and may be used to assess the state of the catalyst during the execution of a catalyst monitor. In particular, CMS 228, operating as a HEGO (heated exhaust gas oxygen) sensor, may monitor an air-fuel ratio of the exhaust gas exiting upstream catalyst 71.

Controller 12 (which may include controller 12 of FIG. 1) is shown in FIG. 2 as a microcomputer, including microprocessor 106, input/output ports 108, an electronic storage medium (e.g., computer-readable) for executable programs and calibration values shown as read-only memory 110 in this particular example, random access memory 112, keep alive memory 114, and a data bus. Storage medium read-only memory 110 can be programmed with computer readable data representing instructions executable by microprocessor unit 106 for performing the methods described herein, as well as other variants that are anticipated but not specifically listed. As described above, FIG. 2 shows one cylinder of a multi-cylinder engine, and it will be appreciated that each cylinder may similarly include its own set of intake/exhaust valves, fuel injector, spark plug, etc.

Controller 12 may receive various signals from sensors coupled to engine 10, in addition to those signals previously discussed, including a degree of operator-demanded torque from pedal position sensor 134, and an air-fuel ratio of exhaust gas downstream of the TWC 71 from catalyst monitor sensor (CMS or HEGO) 228. Controller 12 may also receive signals including measurement of inducted mass airflow (MAF) from mass airflow sensor 122; engine coolant temperature (ECT) from temperature sensor 116 coupled to cooling sleeve 118; a profile ignition pickup signal (PIP) from Hall effect sensor 120 (or other type) coupled to crankshaft 140; throttle position (TP), or throttle opening, from a throttle position sensor; and manifold absolute pressure signal, MAP, from pressure sensor 124, which may be used to provide an indication of vacuum, or pressure, in the intake manifold. Engine speed signal, RPM, may be generated by controller 12 from signal PIP. Note that various combinations of the above sensors may be used, such as a MAF sensor without a MAP sensor, or vice versa. During stoichiometric operation, the MAP sensor can give an indication of engine torque. Further, this sensor, along with the detected engine speed, can provide an estimate of charge (including air) inducted into the cylinder. In one example, Hall Effect sensor 120, which is also used as an engine speed sensor, may produce a predetermined number of equally spaced pulses each and every revolution of the crankshaft. The controller 12 receives signals from the various sensors of FIGS. 1-2 (e.g., HEGO sensor 228, EGO sensor 128, pedal position sensor 134, etc.) and employs the various actuators (e.g., throttle plate 164, spark plug 192, fuel injectors 166, 170, valve actuators 152, 154, etc.) of FIGS. 1-2 to adjust engine operation based on the received signals and instructions stored on a memory of the controller.

For example, responsive to a drop in engine torque demand, based on the output of the pedal position sensor, the controller may send a command signal to at least fuel injector 166 to disable delivery of fuel to cylinder 15. Further, the controller may disable valves 150, 156 via actuators 152, 154.

In this way, the components of FIGS. 1-2 enable an engine system comprising a first cylinder on a first engine bank and a second cylinder on a second engine bank; selectively deactivatable fuel injectors correspondingly coupled to the first and second cylinders; selectively deactivatable valve mechanisms correspondingly coupled to an intake valve and an exhaust valve of the first and second cylinders; an exhaust after-treatment system including a first exhaust catalyst coupled downstream of the first engine bank and a second exhaust catalyst coupled downstream of the second engine bank; and a manifold pressure sensor. The system further includes a controller with computer readable instructions stored on non-transitory memory that when executed cause the controller to, responsive to decreased operator torque demand, operate the first and second cylinders with fuel and valve operation disabled; and, responsive to increased operator torque demand, transition the first cylinder to a deceleration fuel shut-off mode with fuel disabled and valve operation enabled while reactivating fuel and valve operation of the second cylinder if manifold pressure is higher than a threshold pressure at the increased operator torque demand. In one example, reactivating fuel and valve operation of the second cylinder includes operating the second cylinder at stoichiometry, and wherein the controller includes further instructions that cause the controller to reactivate fuel operation of the first cylinder when the manifold pressure has been lowered below the threshold pressure. In a further example, reactivating fuel operation of the first cylinder when the manifold pressure has been lowered below the threshold pressure includes operating the first cylinder richer than stoichiometry based on an oxygen loading of the first exhaust catalyst. The controller may include further instructions that cause the controller to reactivate fuel and valve operation of the first and second cylinders if manifold pressure is higher than the threshold pressure at the increased operator torque demand. In one example, the threshold is based on desired torque. The threshold manifold pressure would be based on the modeled indicated torque that a single cylinder were to produce if it were to open its intake valve in the presence of that manifold pressure. In situations where the desired manifold pressure has not been reached to make the proper indicated torque, the controller would begin reactivating cylinders while also scheduling spark retard to achieve the desired brake torque at a higher than desired indicated torque.

The controller may include further instructions to include a delay between transitioning the first cylinder to the deceleration fuel shut-off mode and reactivation of the second cylinder when the manifold pressure is higher than the threshold pressure, the delay based on driveline frequencies to ensure proper NVH mitigation while increasing the production of torque. For example, there may be a delay between a first cylinder going from DCCO to DFSO. Then a second cylinder going from DCCO to firing would be based on the time it takes the manifold pressure to reduce to a desired pressure, while considering drivability requirements which are meant to prevent hesitation feel. For example, the delay in torque production would be based on the fundamental firing frequency of the engine at the given engine speed as well as to minimize harshness of the reactivation by considering the driveline frequencies (drivability targets). A large delay can excite low order engine content (and violate hesitation limits), while a small delay can excite driveline bump.

Figure 3:
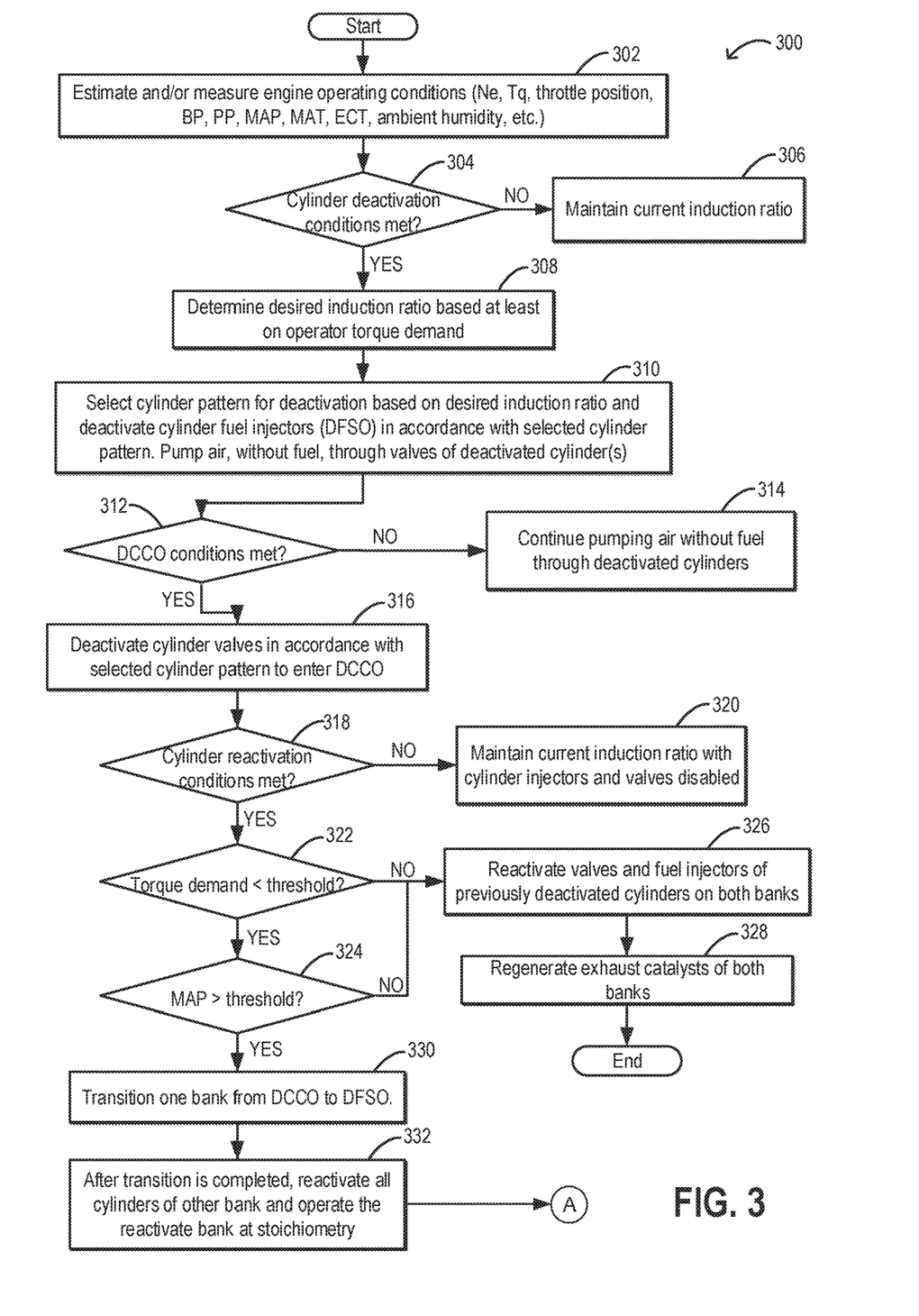
FIGS. 3 and 4 show a high level flow chart illustrating an example method for coordinating reactivation of cylinder fueling and valve operation to reduce catalyst oxygen loading.
Figure 4:
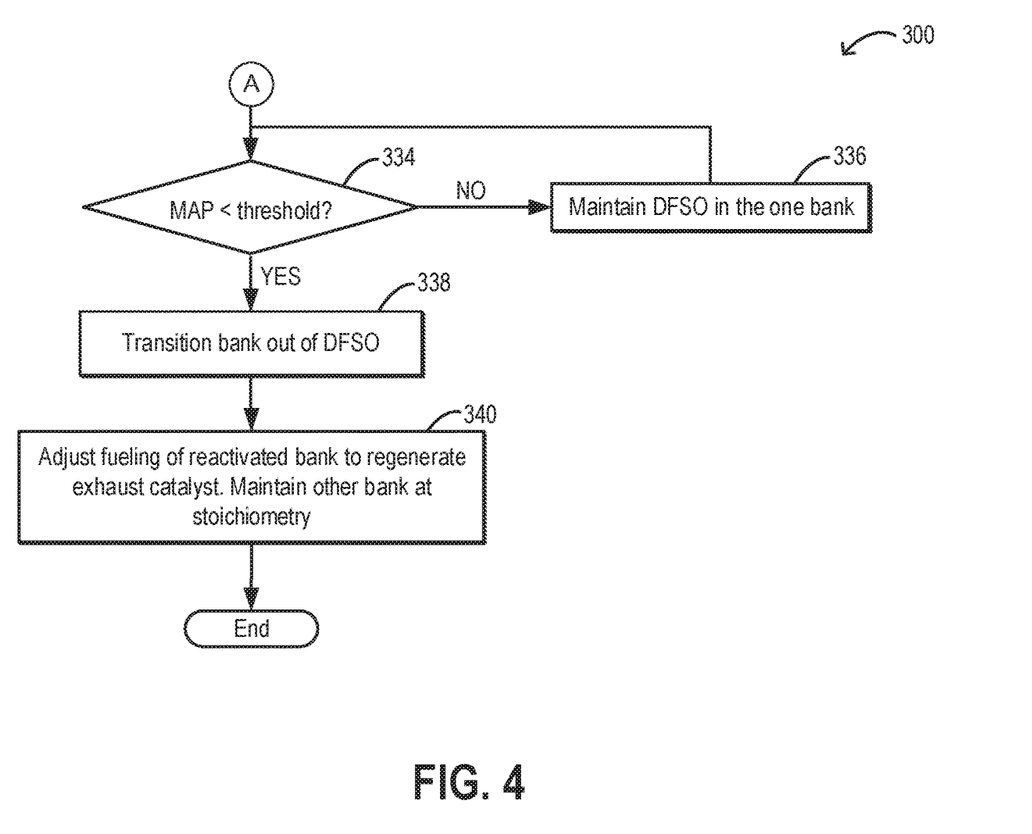
Figure 5:
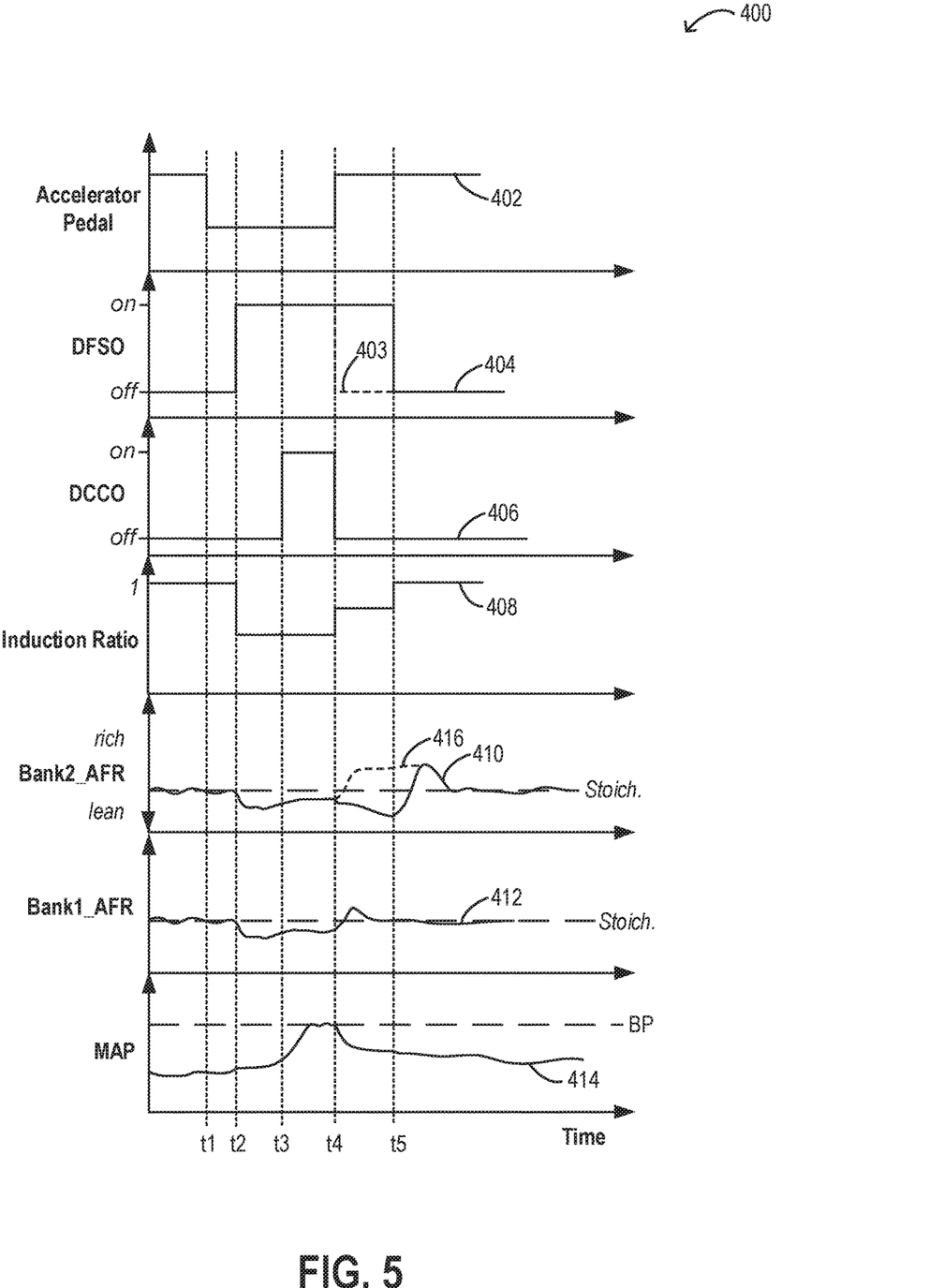
FIG. 5 shows a prophetic example of a cylinder deactivation and reactivation event.

Turning now to FIGS. 3 and 4, an example method 300 is shown for deactivating and reactivating cylinders of a variable displacement engine. The method adjusts a timing of deactivating and reactivating cylinder fueling relative to deactivating and reactivating cylinder valve operation. Instructions for carrying out method 300 may be executed by a controller based on instructions stored on a memory of the controller and in conjunction with signals received from sensors of the engine system, such as the sensors and the engine system described above with reference to FIGS. 1-2. The controller may employ engine actuators of the engine system to adjust engine operation, according to the methods described below.

At 302, the method includes estimating and/or measuring engine operating conditions including, for example, engine speed, vehicle speed, operator torque demand, throttle position, barometric pressure (BP), boost pressure, accelerator pedal position (PP), manifold absolute pressure (MAP), mass air flow (MAF), engine dilution (e.g., EGR level), manifold air temperature (MAT), engine coolant temperature (ECT) and ambient humidity.

At 304, the method includes determining if cylinder deactivation conditions are met. In one example, cylinder deactivation conditions are considered met if engine torque demand is less than a threshold, such as may occur when an operator releases their foot from an accelerator pedal and allows the vehicle to coast. In another example, cylinder deactivation conditions are met if vehicle speed drops below a threshold speed. If cylinder deactivation conditions are not met, then at 306 the method includes maintaining a current induction ratio. The current induction ratio may include all engine cylinders being active and firing. The engine cylinder induction ratio is an actual total number of cylinder firing events over an actual total number of cylinder compression strokes. In one example, the actual total number of cylinder compression strokes is a predetermined number.

If cylinder deactivation conditions are met, then at 308, the method includes determining a desired induction ratio based on the current operating conditions including at least the operator torque demand. As one example, a target induction ratio of 1/2 (or 0.5) implies that for every 2 cylinder events, one cylinder is fired and one is skipped. As another example, a target induction ratio of 1/3 (or 0.33) implies that for every 3 cylinder events, one cylinder is fired and the remaining two are skipped.

At 310, the method includes selecting a cylinder pattern for deactivation that provides the desired induction ratio. As an example, an induction pattern for an induction ratio of 1/2 may include every other cylinder being selectively not fueled to produce half of the power, on average. Further, the same pattern may be applied for each consecutive engine cycle such that the same cylinders are skipped on consecutive engine cycles while the remaining cylinders are fired on each of the engine cycles, giving rise to a stationary pattern. In one example, where cylinders 1-8 are arranged as two banks of 4 cylinders each (bank one having cylinders 1-4, and bank two having cylinders 5-8), with a firing order of 1-5-4-2-6-3-7-8, an induction ratio of 1/2 may be provided by firing according to the induction pattern S-5-S-2-S-3-S-8 wherein S represents a skipped cylinder event.

As another example, an induction pattern for an induction ratio of 1/3 may include two out of every three cylinders being selectively not fueled to produce a third of the power, on average. Further, the induction ratio may be provided by different cylinders being skipped on each engine cycle, giving rise to a non-stationary pattern.

The target or desired induction ratio may be determined from the operator requested engine torque. In particular, allowable engine cylinder firing fraction values may be stored in a table or function that may be indexed by desired engine torque and engine speed. Engine cylinder firing fraction values that may provide the requested engine torque may be part of a group of available engine cylinder firing fraction values. Then, based on other vehicle operating conditions, some engine cylinder firing fractions may be eliminated from the group of available engine cylinder firing fraction values. For example, some engine cylinder firing fractions may be removed from the group if the cylinder firing fractions provide higher levels of engine vibration. Then, the engine cylinder firing fraction that provides the fewest number of active engine cylinders during a cycle may be selected from the group of available engine cylinder firing fraction values to provide the desired engine cylinder firing fraction. In this way, a single desired engine cylinder firing fraction may be selected from a group of a large number of engine cylinder firing fractions. It will be appreciated that the selected engine cylinder firing fraction may then be provided via one of a plurality of possible cylinder deactivation patterns.

In some examples, the selected cylinder pattern may result in deactivated cylinders being symmetrically or asymmetrically distributed between both banks of an engine. In other examples, the selected cylinder pattern may result in deactivated cylinders being located on one engine bank while active cylinders being located on another engine bank.

As used herein, an engine event may be a stroke of a cylinder occurring (e.g., intake, compression, power, exhaust), an intake or exhaust valve opening or closing time, time of ignition of an air-fuel mixture in the cylinder, a position of a piston in the cylinder with respect to the crankshaft position, or other engine related event. The engine event number corresponds to a particular cylinder. For example, engine event number one may correspond to a compression stroke of cylinder number one. Engine event number two may correspond to a compression stroke of cylinder number three. A cycle number refers to an engine cycle which includes one event (activation or deactivation) in each cylinder. For example, a first cycle is completed when each cylinder of an engine has completed all 4 stroke events (intake, exhaust, compression, and expansion events), in the firing order. The second cycle starts when each cylinder of the engine starts another iteration of all 4 stroke events.

Once the cylinder pattern corresponding to the desired induction ratio is selected, the controller may deactivate cylinders in accordance with the selected cylinder pattern to provide the target induction ratio. The selective cylinder deactivation includes, also at 310, for the selected cylinders to be deactivated, initially only deactivating the cylinder fuel injectors while continuing to operate the intake and exhaust valves so that air continues to be pumped through the valves of the deactivated cylinders. Cylinder fuel injectors may be deactivated, with no fuel injected into the cylinders, for an entire engine cycle of 720 crank angle degrees (that is, for all 4 strokes of a cylinder). As a result of disabling cylinder fueling, a deceleration fuel shut-off (DFSO) mode is entered. The air, without added fuel, that is pumped through the deactivated cylinders during the DFSO mode flows on through the exhaust system.

As used herein, cylinder activation event refers to a cylinder firing (that is, fuel and spark enabled) with intake and exhaust valves opening and closing during a cycle of the cylinder. In comparison, a cylinder deactivation event may include one or more of a deceleration fuel shut-off (DFSO) event (or mode) and a deceleration cylinder cut-off (DCCO) event. The DFSO event includes a cylinder not firing (that is, fuel and spark disabled), with intake and exhaust valves continuing to pump air through the cylinder. In comparison, the DCCO event includes, in addition to fuel and spark being disabled, the intake and exhaust valves being held closed during a cycle of the cylinder.

It will be appreciated that the decision to activate or deactivate a cylinder may be made a predetermined number of cylinder events (e.g., one cylinder event, or alternatively, one cylinder cycle or eight cylinder events) before the cylinder is to be activated or deactivated to allow time to begin the process. For example, for an eight cylinder engine with a firing order of 1-3-7-2-6-5-4-8, the decision to activate or deactivate cylinder number seven may be made during an intake or compression stroke of cylinder number seven one engine cycle before cylinder number seven is activated or deactivated. Alternatively, the decision to activate or not activate a cylinder may be made a predetermined number of engine events or cylinder events before the selected cylinder is activated or deactivated. In still further examples, the number of cylinder events may be adjusted based on hardware capabilities and current engine operating conditions.

At 312, it may be determined if DCCO conditions are also met. DCCO conditions may be confirmed responsive to the fuel usage associated with meeting a deceleration target being lower in DCCO than DFSO. DCCO is then used to turn the engine friction losses into a controlled variable in order to provide separate actuators, such as low voltage power network or other electric parts, the ability to regenerate more energy without violating desired vehicle deceleration limits. In one example, the controller may choose to enter DCCO if it was a more fuel efficient way to meet a deceleration target. Using DCCO instead of DFSO while still meeting drivability/deceleration feel would be a fuel economy improvement due to preventing oxygen saturation of the catalyst. However, the controller may choose to remain in DFSO instead of DCCO if it is desirable to send oxygen to the aftertreatment system, such as for diagnostics. If DCCO conditions are not met, at 314, the method includes continuing to pump air without fuel through the deactivated cylinders. If DCCO conditions are met, then at 316, the method includes deactivating cylinder valves so that no air is pumped through the deactivated cylinders, a process herein also referred to as the DCCO mode. In this mode, fuel efficiency is maximized because the DCCO mode avoids saturating the catalyst with oxygen, thereby reducing post-event refueling penalties. In addition, DCCO reduces pumping losses, allowing for longer deceleration events. During these deceleration events, DCCO also allows for more regenerative braking in vehicle equipped with regenerative braking capabilities.

At 318, it is determined if cylinder reactivation conditions are met, such as may occur when the engine load increases, the operator torque demand increases, or when the vehicle speed increases. Confirming cylinder reactivation conditions may include confirming if DCCO and/or DFSO exit conditions are met. If cylinder reactivation conditions are not met, then at 320, the current induction ratio of the engine is maintained with the cylinder injectors and valves disabled (that is, with DFSO and DCCO modes maintained in the deactivated cylinders).

If cylinder reactivation conditions are confirmed, then at 322, it is determined if the torque demand (triggering the reactivation) is lower than a threshold. This threshold may determine whether or not both banks need to be activated at once. One example threshold is 25 Nm on a V8 engine, though the number would depend on the engine and vehicle drivability principles. Another example threshold is 4-5 bar (160-200 Nm) on a 5.0 L V8. Accessory losses could also be a noise factor in determining this threshold due to their effect on driveline torque versus the indicated torque the engine is producing. Alternatively, if the controller aims to minimize spending the catalyst reactivation fuel unless it is absolutely necessary, a fairly high threshold, such as one near the maximum of what could be made with an induction ratio of 0.5, may be applied. For example, the threshold may be set at 4-5 bar on a 5.0 L V8 engine (that is, 160-200 Nm). If the torque demand is above the threshold, then the method moves to 326 to reactivate cylinder valves and fuel injectors of the previously deactivated cylinders of both banks of cylinders. After reactivating the cylinders, at 328, the method includes regenerating the exhaust catalysts of both engine banks. During the preceding DFSO, the exhaust catalyst may have been saturated with oxygen. Once the catalyst is saturated with oxygen, it needs "re-centering" to allow maximum efficiency. "Re-centering" is accomplished by operating the engine, upon reactivation, with an air/fuel ratio rich of stoichiometry. The degree of richness applied as well as the duration of rich operation may be adjusted as a function of the oxygen saturation. For example, as the duration of DFSO operation of the cylinders increases, the degree of richness and/or the duration of rich operation upon reactivation may be increased. The method then exits. As such, the added fuel requirement can reduce the fuel economy impact of the selective cylinder deactivation operation.

If the torque demand is less than the threshold, then at 324, it may be determined if the manifold pressure (MAP) is higher than a threshold pressure, such as at barometric pressure. Manifold pressure may be sensed via a MAP sensor, such as sensor 124 of FIG. 2. During the DCCO operation, while the cylinder valves are closed, the engine manifold may equilibrate with atmospheric pressure and the manifold vacuum generated during engine operation is dissipated. If the MAP is not sufficiently reduced before the reactivation, then the torque output of the cylinders may be higher than desired, resulting in unwanted torque transients that can reduce vehicle drivability. If the MAP is not higher than the threshold, then the method returns to 326 to reactivate valves and fuel injectors of previously deactivated cylinders on both banks, and re-center catalysts using a rich regeneration at 328. The method then ends.

If MAP is higher than the threshold, then at 330, the method includes selectively transitioning deactivated cylinders on only bank of the engine from the DCCO mode to the DFSO mode. This includes reactivating cylinder valve operation for the deactivated cylinders while maintaining fuel injectors for those cylinders disabled. As a result of the reactivation of cylinder valves, air may start to be pumped through the cylinders without fuel, causing the manifold pressure to start to drop.

After transitioning deactivated cylinders of the one bank from the DCCO mode to the DFSO mode, at 332, deactivated cylinders of the other bank may be reactivated including reactivating fuel injectors and cylinders valves and operating the reactivated cylinders at or around stoichiometry. By reactivating the cylinders of this bank after transitioning the cylinders of the other bank out of DCCO to DFSO, torque transients are reduced. Options to address torque transients include but are not limited to usage of spark retard, active mounts, torque converter slip, etc.

The actions may be performed in a defined order of events so as to receive air only on one bank to get MAP down, and then reactivate the other bank so that it can run at stoichiometry. Any torque transients being reduced would be dependent on manifold dynamics/induction pattern of the engine. When the second bank's cylinders begin to induct, there will be a change in pumping work. At that time, the controller may operate the engine to potentially produce more torque on the first bank of cylinders to offset that increase in pumping work.

A first example of the order of events includes: initially transition a first bank from DCCO to DFSO by reactivating cylinder valves. Then, the manifold air pressure is decreased by pumping air through the cylinder valves. Then, the second bank is reactivated by transitioning from DCCO to operating at stoichiometry. Then, the first bank is reactivated including operating richer than stoichiometry until the catalyst of the corresponding is reactivated. Then, finally both banks are returned to stoichiometry.

Another example of the order of events includes: initially transition a first bank from DCCO to DFSO by reactivating cylinder valves. Then, the manifold air pressure is decreased by pumping air through the cylinder valves. Then, the first bank is reactivated including operating richer than stoichiometry until the catalyst of the corresponding is reactivated. Subsequently, the second bank is reactivated by transitioning from DCCO to operating at stoichiometry. Eventually both banks are returned to stoichiometry.

The steps of operating the second bank at stoichiometry and operating the first bank richer than stoichiometry could be happening simultaneously (within the same engine cycle) because if desired induction ratio involves firing on both banks, it may be possible to be firing both banks in the same engine cycle. In such a situation, the controller may need to manage which cylinders were on the DFSO bank and thus needed enrichment and which cylinders were on the DCCO bank and thus could maintain stoichiometry.

The method then moves to 334 (FIG. 4) to reassess manifold pressure. If the sensed manifold pressure has sufficiently reduced (for example, from barometric conditions to manifold vacuum conditions), or dropped below a threshold, below which resuming of fuel delivery will not result in torque being over-delivered, then at 338, the bank of cylinders are transitioned out of the DFSO mode. This includes reactivating the cylinder fuel injectors. Else at 336, the bank of cylinders may be maintained in the DFSO state with cylinder valves continuing to operate and pump air through the cylinders with no fuel.

At 340, after reactivating the cylinders and transitioning them out of DFSO, the method includes regenerating the exhaust catalyst coupled downstream of the reactivated bank. During the preceding DFSO, the exhaust catalyst may have been saturated with oxygen. Once the catalyst is saturated with oxygen, it needs "re-centering" to allow maximum efficiency. "Re-centering" is accomplished by operating the reactivated with an air/fuel ratio rich of stoichiometry. The degree of richness applied as well as the duration of rich operation may be adjusted as a function of the oxygen saturation. However, by pumping the MAP down via the use of cylinder valves on only bank, the fuel penalty associated with the catalyst regeneration is limited to only the regeneration of the catalyst coupled downstream of that bank (and not both banks). As a result, the fuel penalty of the operation is reduced.

In one example, as the duration of DFSO operation required to drop the MAP below the threshold increases, the degree of richness and/or the duration of rich operation upon reactivation increase. The method then exits. In this way, the added fuel requirement is reduced, and the fuel economy impact of the selective cylinder deactivation operation is limited. In particular, only the exhaust volume of the downstream catalyst of the bank that was transitioned to a DFSO has to be regenerated from oxygen saturation, reducing the associated fuel penalty during the subsequent catalyst regeneration event.

In some examples, the controller may additionally or optionally compare a first fuel penalty associated with reactivating cylinder valves and fuel injectors of both banks and re-centering the exhaust catalysts of both banks with a first rich fuel operation for a first duration with a second fuel penalty associated with reactivating cylinder valves and fuel injectors of one bank, reactivating cylinder valves and not fuel injectors of the other bank and re-centering the exhaust catalyst of the bank operating with DFSO at a second rich fuel operation for a second duration. If the second fuel penalty is smaller than the first fuel penalty, then the controller may continue to reactivate one bank while transitioning the other bank from a DCCO to a DFSO state. Else, if the second fuel penalty is larger than the first fuel penalty, the controller may reactivate both banks, and operate both with a transient rich operation to re-center their catalysts before resuming stoichiometric operation.

In this way, the controller may need to ensure that excess oxygen is not introduced into any one exhaust catalyst instead of introducing half that amount in both catalysts, reducing the overall fuel penalty as a result. There may be a maximum oxygen saturation a catalyst can end up at, which may be amount of oxygen saturation required. To get a single fully saturated catalyst back to stoichiometry would correspond to the maximum fuel that would need to be added to any reactivation event.

In addition to adjusting the reactivation based on catalyst oxygen saturation, the controller may also adjust the reactivation as a function of catalyst temperature (e.g., absolute temperature for any one exhaust catalyst or their relative difference).

In one example, the threshold that determines when a bank can be fired and cylinders thereon can be reactivated based on manifold pressure, in particular, a total number of pump down events required to decrease MAP. If the total amount of air required to pump down manifold is greater than the oxygen storage capacity of a single catalyst, the controller may apply the single bank method to ensure that only the single catalyst becomes saturated with oxygen. This would need to be balanced with the required time to torque considerations.

Turning now to FIG. 5, prophetic examples of cylinder deactivation and reactivation events, including transitions between DFSO and DCCO modes, are depicted. Map 400 depicts accelerator pedal position (PP) at plot 402. The pedal position is indicative of torque demand. As the accelerator pedal position increases along the y-axis, it indicates that the pedal has been depressed by an operator, and is reflective of an increased demand for engine torque. As the accelerator pedal position decreases along the y-axis, it indicates that the pedal has been released by an operator, and is reflective of a decreased demand for engine torque. The occurrence of a DFSO event on first and second banks of an engine is shown at plots 403, 404, respectively. When a DFSO flag is on, it implies that one or more cylinders of that bank may be selectively deactivated by disabling fuel and spark delivery, while air continues to be pumped through open intake and exhaust valves of the deactivated cylinders. The occurrence of a DCCO event on first and second banks of the engine is shown at plot 406. When a DCCO flag is on, it implies that the one or more cylinders that had fuel and spark disabled now also have their intake and exhaust valves closed. An engine induction ratio is depicted at plot 408. The induction ratio may change with torque demand. Based on the selected induction ratio, a number and identity of cylinders to be deactivated is selected. An induction ratio of 1.0 indicates all engine cylinders are active. An induction ratio below 1.0 indicates at least some cylinders are deactivated. The air-fuel ratio (AFR) sensed at an exhaust oxygen sensor coupled to an exhaust catalyst of the second bank (Bank2_AFR) is shown at plot 410. The air-fuel ratio (AFR) sensed at an exhaust oxygen sensor coupled to an exhaust catalyst of the first bank (Bank1_AFR) is shown at plot 412. As the AFR increases along the y-axis, the air-fuel ratio becomes richer relative to stoichiometry (shown as a dashed line). As the AFR falls below the dashed line, the air-fuel ratio becomes leaner relative to stoichiometry. Manifold pressure (MAP) sensed at an engine intake manifold is shown at plot 414 in relation to barometric pressure (BP).

Prior to t1, operator torque demand is elevated (plot 402) and the torque demand is met by operating all engine cylinders active. As a result, none of the cylinders on either bank are operating with either fuel deactivated (plots 403, 404) or cylinder valves closed (plot 406). The induction ratio achieved with all cylinders firing is 1.0 (plot 408). Cylinders are operated at an AFR around stoichiometry (plots 410, 412). Due to engine rotation and cylinder combustion, there is an intake manifold vacuum (plot 414).

At t1, responsive to an operator pedal tip-out, cylinder deactivation conditions are met. In response to the tip-out, at t2, a lower induction ratio corresponding to the lower torque demand is provided by selectively deactivating one or more cylinders. The number of cylinders deactivated may be increased as the torque demand decreases, allowing the same torque demand to be met using a fewer number of active cylinders operating with a higher average output and therefore a lower pumping loss. The cylinders selected for deactivation are transitioned to a DFSO mode by deactivating corresponding fuel injectors. However, cylinder valves remain open as indicated by the DCCO flag remaining in the off state. As a result of the deactivation, the induction ratio drops below 1.0 (for example, drops to 0.5 where every second cylinder is deactivated, or 0.67 where every third cylinder is deactivated). In the depicted example, cylinders selected for disablement are located on both engine banks. As a result of cylinder fueling being disabled while cylinder valves continue to operate, air (without fuel) flows through the cylinders towards the exhaust components, causing a gradual oxygen saturation. This is observed based on a gradual enleanment in the AFR estimated at the downstream exhaust gas sensor of both banks.

At t3, responsive to DCCO conditions being met while the torque demand remains low, cylinder valves are closed (of the selectively deactivated cylinders), while fuel and spark remains disabled, thereby transitioning the deactivated cylinders from the DFSO mode to the DCCO mode. Between t3 and t4, the deactivated cylinders are operated in the DCCO mode with both fuel and cylinder valve operation disabled. The exhaust gas sensor response on both banks remains lean but steady since no further oxygen saturation of the catalyst is occurring. Also between t3 and t4, due to the cylinder valves not operating, the manifold vacuum starts to dissipate the manifold pressure equilibrates with barometric pressure.

At t4, responsive to an operator pedal tip-in, cylinder reactivation conditions are met. However, the torque demand at this time remains lower than a threshold (more indicated by a smaller than threshold pedal displacement on the tip-in). If all the cylinders are reactivated, the higher than desired MAP will result in a torque disturbance, specifically, a torque transient where more torque is delivered than requested. In addition, the higher than desired flow of air through the engine will cause an enleanment which will further saturate the exhaust catalysts and require a significant fuel penalty to re-center the catalysts upon reactivation. The fuel penalty may outweigh the fuel economy benefit from the preceding cylinder deactivation operation.

To limit the fuel penalty, at t4, the first bank is reactivated by resuming fuel and spark delivery and valve operation. As shown at plot 403 and 406, the first bank is transitioned out of DFSO and DCCO upon reactivation. This bank is operated rich for a short duration, indicated by the bump in AFR following t4, and then the bank resumes operation at stoichiometry. The short rich operation enables the catalyst of the first bank to be regenerated. The associated fuel penalty includes the area under the rich curve. As a result of reactivating the first bank, the induction ratio increases, but not to 1 since the second bank is not yet fully reactivated.

Also at t4, the first bank is transitioned out of DCCO while DFSO is maintained. That is, between t4 and t5, while the first bank is reactivated and operated at stoichiometry, the second bank is maintained at DFSO with the valves pumping air. This allows the manifold pressure to be reduced. At t5, once MAP has been sufficiently reduced, the second bank is reactivated by transitioning the cylinders out of DFSO. As with the first bank, following exit from DFSO, the cylinders of the second bank are operated rich for a short duration, indicated by the bump in AFR following t5, and then the bank resumes operation at stoichiometry. The short rich operation enables the catalyst of the second bank to be regenerated. The associated fuel penalty includes the area under the rich curve. As a result of reactivating the second bank, the induction ratio increases to 1 since all cylinders are now fully active.

It will be appreciated that by reactivating the second bank only after MAP has been sufficiently lowered via DCCO mode of operation, torque transients due to higher than desired air flow are averted. At the same time, by transitioning the first bank out of DFSO while the second bank operates with DFSO, oxygen saturation is limited to only the exhaust catalyst of the second bank. As a result the associated fuel usage in regenerating the catalyst is reduced. As such, if both banks were transitioned out of DFSO at t4, while MAP was elevated, the resulting enleanment of the catalyst of both banks would have resulted in need for a longer and deeper regeneration, as indicated by the area under dashed segment 416.

In this way, cylinder deactivation in a rolling variable displacement engine can be enabled in a manner that balances fuel efficiency and tailpipe emissions. By selectively reactivating only cylinder valve mechanisms and transitioning cylinders of only bank of an engine from DCCO to DFSO, pumping of air through the deactivated cylinders can be used to lower manifold pressure. The technical effect of concurrently reactivating cylinder valves and fuel injectors of cylinders of the other bank is that rich fueling is only required to re-center one exhaust catalyst. As a result, fuel penalty associated with re-centering exhaust catalysts following a DFSO operation is reduced.

One example method for an engine comprises operating an engine with cylinder valves and fuel injectors of a first and a second group of cylinders deactivated; and responsive to cylinder cut-off exit conditions being met, operating the first group of cylinders with cylinder valves reactivated and fuel injectors disabled while operating the second group of cylinders fueled and with all engine cylinder valves reactivated until manifold pressure is lower than a threshold. In the preceding example, additionally or optionally, the cylinder cut-off exit conditions being met include an increase in operator torque demand, and wherein the method further comprises lowering the manifold pressure by pumping air through the reactivated cylinder valves of the first group of cylinders with fuel injector disabled. In any or all of the preceding examples, additionally or optionally, the method further comprises, after lowering the manifold pressure below the threshold, enabling the fuel injectors of the first group of cylinders. In any or all of the preceding examples, additionally or optionally, the method further comprises, responsive to the increase in torque demand, reactivating the cylinder valves of the first group of cylinders before operating the second group of cylinders fueled and with all engine cylinder valves reactivated. In any or all of the preceding examples, additionally or optionally, operating the second group of cylinders fueled and with all engine cylinder valves reactivated includes operating the second group of cylinders at stoichiometry. In any or all of the preceding examples, additionally or optionally, the method further comprises, after enabling the fuel injectors of the first group of cylinders, operating the first group of cylinders at an air-fuel ratio richer than stoichiometry, a degree of richness and/or a duration of rich operation based on an oxygen saturation of a first exhaust catalyst selectively coupled to the first group of cylinders, the first exhaust catalyst distinct from a second exhaust catalyst selectively coupled to the second group of cylinders. In any or all of the preceding examples, additionally or optionally, the oxygen saturation of the first exhaust catalyst is inferred from a preceding duration of operating the first group of cylinders with fuel injectors disabled and the manifold pressure over the preceding duration. In any or all of the preceding examples, additionally or optionally, the operating the engine with cylinder valves and fuel injectors of the first and second group of cylinders deactivated is responsive to a decrease in the torque demand. In any or all of the preceding examples, additionally or optionally, the cylinder valves of the first and second group of cylinders are disabled after disabling the fuel injectors responsive to the decrease in the torque demand. In any or all of the preceding examples, additionally or optionally, the threshold is based on torque demand relative to torque capacity of the engine at a current manifold pressure.

Another example method for an engine comprises: deactivating all engine cylinder valves of a first and second group of cylinders responsive to deceleration cylinder cut-off (DCCO) entry conditions being met; and responsive to DCCO exit conditions being met while manifold pressure is higher than a threshold, operating the first group of cylinders with fuel disabled and all engine cylinder valves reactivated while operating the second group of cylinders fueled at stoichiometry and with all engine cylinder valves activated. In any or all of the preceding examples, additionally or optionally, the operating is continued until the manifold pressure is below the threshold. In any or all of the preceding examples, additionally or optionally, the method further comprises, after the manifold pressure is below the threshold, resuming fueling of the first group of cylinders. In any or all of the preceding examples, additionally or optionally, resuming fueling includes operating the first group of cylinders at an air-fuel ratio richer than stoichiometry for a duration to regenerate a first exhaust catalyst selectively coupled to the first group of cylinders, the first exhaust catalyst distinct from a second exhaust catalyst selectively coupled to the second group of cylinders.

Another example engine system comprises: a first cylinder on a first engine bank and a second cylinder on a second engine bank; selectively deactivatable fuel injectors correspondingly coupled to the first and second cylinder; selectively deactivatable valve mechanisms correspondingly coupled to an intake valve and an exhaust valve of the first and second cylinder; an exhaust after-treatment system including a first exhaust catalyst coupled downstream of the first engine bank and a second exhaust catalyst coupled downstream of the second engine bank; a manifold pressure sensor; and a controller with computer readable instructions stored on non-transitory memory that when executed cause the controller to: responsive to decreased operator torque demand, operate the first and second cylinder with fuel and valve operation disabled; and responsive to increased operator torque demand, transition the first cylinder to a deceleration fuel shut-off mode with fuel disabled and valve operation enabled while reactivating fuel and valve operation of the second cylinder if manifold pressure is higher than a threshold at the increased operator torque demand. In any or all of the preceding examples, additionally or optionally, reactivating fuel and valve operation of the second cylinder includes operating the second cylinder at stoichiometry, and wherein the controller includes further instructions that cause the controller to reactivate fuel operation of the first cylinder when the manifold pressure has been lowered below the threshold pressure. In any or all of the preceding examples, additionally or optionally, reactivating fuel operation of the first cylinder when the manifold pressure has been lowered below the threshold pressure includes operating the first cylinder richer than stoichiometry based on an oxygen loading of the first exhaust catalyst. In any or all of the preceding examples, additionally or optionally, the controller includes further instructions that cause the controller to reactivate fuel and valve operation of the first and second cylinder if manifold pressure is higher than the threshold at the increased operator torque demand. In any or all of the preceding examples, additionally or optionally, the threshold is based on the increased torque demand relative to a torque capacity of the engine at the manifold pressure with the first and second cylinder reactivated. In any or all of the preceding examples, additionally or optionally, the controller includes further instructions to include a delay between transitioning the first cylinder to the deceleration fuel shut-off mode and reactivation of the second cylinder when the manifold pressure is higher than the threshold the delay based on a firing frequency of the engine at a current engine speed and an NVH limit of the engine.

In another representation, the engine system is coupled to a hybrid vehicle system and/or an autonomous vehicle system. In a further representation, a method for an engine comprises: responsive to an increase in operator torque demand, reactivating fuel and valve operation for deactivated cylinders of a first engine bank, reactivating valve operation for deactivated cylinder of a second engine bank, and delaying transition out of a deceleration fuel shut-off (DFSO) mode for the deactivated cylinders of the second engine bank until manifold pressure is lowered below a threshold. In any or all of the preceding examples, additionally or optionally, reactivating fuel and valve operation for deactivated cylinders of the first engine bank includes operating reactivated cylinders of the first engine bank at or around stoichiometry. In any or all of the preceding examples, additionally or optionally, the method further comprises, after transitioning the deactivated cylinders of the second engine bank out of the DFSO mode, operating the reactivated cylinders of the second engine bank richer than stoichiometry for a duration to re-center an exhaust catalyst selectively coupled downstream of the second engine bank, the exhaust catalyst distinct from another exhaust catalyst selectively coupled downstream of the first engine bank.

Note that the example control and estimation routines included herein can be used with various engine and/or vehicle system configurations. The control methods and routines disclosed herein may be stored as executable instructions in non-transitory memory and may be carried out by the control system including the controller in combination with the various sensors, actuators, and other engine hardware. The specific routines described herein may represent one or more of any number of processing strategies such as event-driven, interrupt-driven, multi-tasking, multi-threading, and the like. As such, various actions, operations, and/or functions illustrated may be performed in the sequence illustrated, in parallel, or in some cases omitted. Likewise, the order of processing is not necessarily required to achieve the features and advantages of the example embodiments described herein, but is provided for ease of illustration and description. One or more of the illustrated actions, operations and/or functions may be repeatedly performed depending on the particular strategy being used. Further, the described actions, operations and/or functions may graphically represent code to be programmed into non-transitory memory of the computer readable storage medium in the engine control system, where the described actions are carried out by executing the instructions in a system including the various engine hardware components in combination with the electronic controller.

It will be appreciated that the configurations and routines disclosed herein are exemplary in nature, and that these specific embodiments are not to be considered in a limiting sense, because numerous variations are possible. For example, the above technology can be applied to V-6, I-4, I-6, V-12, opposed 4, and other engine types. The subject matter of the present disclosure includes all novel and non-obvious combinations and sub-combinations of the various systems and configurations, and other features, functions, and/or properties disclosed herein.

As used herein, the term "approximately" is construed to mean plus or minus five percent of the range unless otherwise specified.

The following claims particularly point out certain combinations and sub-combinations regarded as novel and non-obvious. These claims may refer to "an" element or "a first" element or the equivalent thereof. Such claims should be understood to include incorporation of one or more such elements, neither requiring nor excluding two or more such elements. Other combinations and sub-combinations of the disclosed features, functions, elements, and/or properties may be claimed through amendment of the present claims or through presentation of new claims in this or a related application. Such claims, whether broader, narrower, equal, or different in scope to the original claims, also are regarded as included within the subject matter of the present disclosure.

The invention claimed is:

1. A method for an engine, comprising:
   operating an engine with cylinder valves and fuel injectors of a first and a second group of cylinders deactivated; and
   responsive to cylinder cut-off exit conditions being met, operating the first group of cylinders with cylinder valves reactivated and fuel injectors disabled while operating the second group of cylinders fueled and with all engine cylinder valves reactivated until manifold pressure is lower than a threshold.

2. The method of claim 1, wherein the cylinder cut-off exit conditions being met include an increase in operator torque demand, the method further comprising, lowering the manifold pressure by pumping air through the reactivated cylinder valves of the first group of cylinders with fuel injector disabled.

3. The method of claim 1, further comprising,
   after lowering the manifold pressure below the threshold, enabling the fuel injectors of the first group of cylinders.

4. The method of claim 2, further comprising, responsive to the increase in torque demand, reactivating the cylinder valves of the first group of cylinders before operating the second group of cylinders fueled and with all engine cylinder valves reactivated.

5. The method of claim 1, wherein operating the second group of cylinders fueled and with all engine cylinder valves reactivated includes operating the second group of cylinders at stoichiometry.

6. The method of claim 2, further comprising, after enabling the fuel injectors of the first group of cylinders, operating the first group of cylinders at an air-fuel ratio richer than stoichiometry, a degree of richness and/or a duration of rich operation based on an oxygen saturation of a first exhaust catalyst selectively coupled to the first group of cylinders, the first exhaust catalyst distinct from a second exhaust catalyst selectively coupled to the second group of cylinders.

7. The method of claim 6, wherein the oxygen saturation of the first exhaust catalyst is inferred from a preceding duration of operating the first group of cylinders with fuel injectors disabled and the manifold pressure over the preceding duration.

8. The method of claim 1, wherein the operating the engine with cylinder valves and fuel injectors of the first and second group of cylinders deactivated is responsive to a decrease in the torque demand.

9. The method of claim 8, wherein the cylinder valves of the first and second group of cylinders are disabled after disabling the fuel injectors responsive to the decrease in the torque demand.

10. The method of claim 1, where the threshold is based on a torque output of the engine at the given manifold pressure.

11. A method for an engine, comprising:
    deactivating all engine cylinder valves of a first and second group of cylinders responsive to deceleration cylinder cut-off (DCCO) entry conditions being met; and
    responsive to DCCO exit conditions being met while manifold pressure is higher than a threshold,
    operating the first group of cylinders with fuel disabled and all engine cylinder valves reactivated while operating the second group of cylinders fueled at stoichiometry and with all engine cylinder valves activated.

12. The method of claim 11, wherein the operating is continued until the manifold pressure is below the threshold.

13. The method of claim 12, further comprising, after the manifold pressure is below the threshold, resuming fueling of the first group of cylinders.

14. The method of claim 13, wherein the resuming fueling includes operating the first group of cylinders at an air-fuel ratio richer than stoichiometry for a duration to regenerate a first exhaust catalyst selectively coupled to the first group of cylinders, the first exhaust catalyst distinct from a second exhaust catalyst selectively coupled to the second group of cylinders.

15. An engine system, comprising:
    a first cylinder on a first engine bank and a second cylinder on a second engine bank;
    selectively deactivatable fuel injectors correspondingly coupled to the first and second cylinder;
    selectively deactivatable valve mechanisms correspondingly coupled to an intake valve and an exhaust valve of the first and second cylinder;
    an exhaust after-treatment system including a first exhaust catalyst coupled downstream of the first engine bank and a second exhaust catalyst coupled downstream of the second engine bank;
    a manifold pressure sensor; and
    a controller with computer readable instructions stored on non-transitory memory that when executed cause the controller to:
    responsive to decreased operator torque demand, operate the first and second cylinder with fuel and valve operation disabled; and responsive to increased operator torque demand, transition the first cylinder to a deceleration fuel shut-off mode with fuel disabled and valve operation enabled while reactivating fuel and valve operation of the second cylinder if manifold pressure is higher than a threshold at the increased operator torque demand.

16. The system of claim 15, wherein reactivating fuel and valve operation of the second cylinder includes operating the second cylinder at stoichiometry, and wherein the controller includes further instructions that cause the controller to reactivate fuel operation of the first cylinder when the manifold pressure has been lowered below the threshold pressure.

17. The system of claim 15, wherein reactivating fuel operation of the first cylinder when the manifold pressure has been lowered below the threshold pressure includes operating the first cylinder richer than stoichiometry based on an oxygen loading of the first exhaust catalyst.

18. The system of claim 15, wherein the controller includes further instructions that cause the controller to reactivate fuel and valve operation of the first and second cylinder if manifold pressure is higher than the threshold at the increased operator torque demand.

19. The system of claim 15, wherein the threshold is based on torque output of the engine at the given manifold pressure relative to operator torque demand.

20. The system of claim 15, wherein the controller includes further instructions to include a delay between transitioning the first cylinder to the deceleration fuel shut-off mode and reactivation of the second cylinder when the manifold pressure is higher than the threshold the delay based on engine firing frequency at a current engine speed.

* * * * *